United States Patent [19]

Emerick

[11] 4,324,715

[45] Apr. 13, 1982

[54] LOW CURING EPOXY N-RESIN COATING COMPOSITION

[75] Inventor: Dennis P. Emerick, Aston, Pa.

[73] Assignee: E. I. DuPont de Nemours and Company, Wilmington, Del.

[21] Appl. No.: 201,784

[22] Filed: Oct. 29, 1980

[51] Int. Cl.³ .............................................. C08K 5/10
[52] U.S. Cl. .................................... 523/400; 525/110; 525/5; 525/121; 427/386; 523/455; 523/456
[58] Field of Search ................. 260/31.4 EP, 29.6 F; 525/110, 121, 5; 427/386

[56] References Cited

U.S. PATENT DOCUMENTS

| | | | |
|---|---|---|---|
| 2,795,565 | 6/1957 | Newey | 260/31.4 EP |
| 3,123,582 | 3/1964 | Tryzna | 260/43 |
| 3,678,004 | 7/1972 | Meyers | 260/31.4 EP |
| 3,784,506 | 1/1974 | Vasta | 525/110 |

*Primary Examiner*—Joseph L. Schofer
*Assistant Examiner*—Nabil Sarofim
*Attorney, Agent, or Firm*—Richard H. Burgess

[57] ABSTRACT

A coating composition comprising a dispersion of an epoxy resin, a nitrogen resin crosslinker such as a melamine formaldehyde, a particulate fluorocarbon such as PTFE, and citric acid can be applied to substrates such as polysulfones and cured at low temperatures on the order of 107° C. The resulting coating is especially useful as a barrier to seal the surface of the substrate and to improve abrasion resistance.

6 Claims, No Drawings

LOW CURING EPOXY N-RESIN COATING COMPOSITION

BACKGROUND

There is a need for coatings which can be used to apply to plastic substrates such as of polysulfone, polyester and polycarbonate resins to act as a barrier by sealing the surface and to enhance resistance to scratching. Plastic substrates are useful in cookware for use in microwave ovens, where such coatings may be particularly desirable.

Known coatings, including epoxy resins, urea formaldehyde crosslinkers and polytetrafluoroethylene (PTFE) generally require temperatures such as 204° C. to cure. Curing temperatures as high as this are unacceptable for certain kinds of plastic substrates. Furthermore, it is generally desirable to use lower cure temperatures when possible.

SUMMARY

The present invention provides a coating composition consisting essentially, in percent by weight of (A), (B), (C), (D) plus (E), of a dispersion in a liquid organic media of about:

(A) 10–50% of an epoxy resin containing, on the average, two terminal 1,2-epoxy groups per molecule and having an epoxy equivalent weight of 750–5000;

(B) 1–20% of a melamine formaldehyde resin;

(C) 1–10% particulate polymer polymerized or copolymerized from monomers selected from one or more monoethylenically unsaturated hydrocarbon monomers and hydrocarbon ether monomers, said monomers being completely substituted with fluorine atoms;

(D) 0.2–5% citric acid; and (E) the balance being said liquid organic media.

Preferably, the fluorocarbon resin is PTFE. A preferred form of fluorocarbon resin is irradiated micropowder such as that described in U.S. Pat. No. 4,029,870—Brown (1977).

DETAILED DESCRIPTION

The various ingredients used in the present invention are blended together using ordinary mixing equipment.

The fluorocarbon polymers used are those of hydrocarbon monomers completely substituted with fluorine atoms. Included in this group are perfluoroolefin polymers such as polytetrafluoroethylene (PTFE) and copolymers of tetrafluoroethylene and hexafluoropropylene in all monomer unit weight ratios, and copolymers of tetrafluoroethylene and perfluoroalkyl vinyl ethers. Mixtures of these can also be used.

The epoxy resins to be utilized in the present invention are commonly known in the art. One class of such resins has the generalized formula

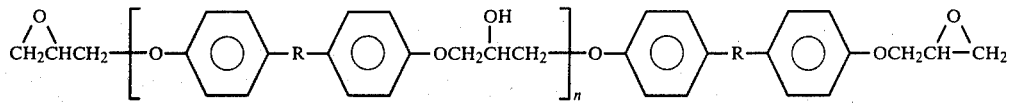

wherein R is an alkylene group of 1–4 carbon atoms and n is an integer from 1–12. The epoxy resins utilized in this invention contain an average of two terminal 1,2-epoxy groups per molecule and are in the epoxy equivalent weight range of 750–5000, preferably 1500–4000. They can also contain substituted aromatic rings.

One such preferred epoxy resin is Epon ® 1004 sold by Shell Chemical Co. where R is isopropylidene, the average value of n is 5, having an epoxy equivalent weight of 875–1025, with an average of about 950±50. The epoxy equivalent weight is defined as the grams of resin containing 1 gram-equivalent of epoxide as measured by ASTM-D-1652. The coating composition containing "Epon 1004" affords a glossy, flexible, chemically-resistant film. Another preferred epoxy resin is "Epon 1007" where R is iopropylidene, the average value of n is 11, having an epoxy equivalent weight of 2000–2500, with an average of about 2175±50.

Nitrogen resin crosslinker are well known. They are the alkylated products of amino-resins prepared by the condensations of at least one aldehyde with at least one of urea, benzoguanamine N,N'-ethyleneurea, dicyandiamide, and aminotriazines such as melamines. Among the aldehydes that are suitable are formaldehyde, revertible polymers thereof such as paraformaldehyde, acetaldehyde, crotonaldehyde, and acrolein. Preferred are formaldehyde and revertible polymers thereof. The amino-resins are alkylated with at least one and up to and including six alkanol molecules containing 1–6 carbon atoms. The alkanols can be straight chain, branches or cyclic.

Nitrogen resins preferred for the invention are melamine formaldehyde resins. The melamine portions are preferably partially methylated melamines, partially butylated melamines, hexaethoxymethylmelamine, hexamethoxymethylmelamine, dimethoxytetraethoxymethylmelamine, dibutoxytetramethoxymethylmelamine, hexabutoxymethylmelamine, and mixtures thereof. Commercially available preferred melamine formaldehyde resins include the following products of American Cyanamid Co.:

Cymel ® 303 highly methylated melamine
Cymel ® 1116 highly methylated and ethylated melamine
Cymel ® 1130 highly butylated melamine
Cymel ® 1156 highly butylated melamine
"Beetle 65" melamine formaldehyde In the claims, the term "consisting essentially of" means not including other ingredients in amounts which change the basic and novel characteristics of the invention, including providing low-temperature curing barrier and abrasion resistant coatings. Other commonly utilized additives such as coalescing aids, flow-control agents, plasticizers, pigments and the like can be added in the usual amounts, if this appears necessary or desirable.

It has surprisingly been found that the addition of citric acid in accordance with the invention permits curing these coatings at temperatures low enough to permit them to be used on polysulfone, polyester or polycarbonate substrates.

In the examples, as elsewhere herein, percentages and proportions are by weight.

EXAMPLE 1

A coating compositon is prepared as follows:

Portion 1

PTFE micropowder irradiated at 7.5 megarads and subsequently heated at 260° C.

Portion 2

| | |
|---|---|
| "Epon 1007" (epoxy resin from Shell Chemical Co.) | 14.84% |
| Butyl Acetate | 33.79% |
| Cellosolve acetate | 12.68% |
| n-Butyl alcohol | 5.28% |
| Methyl isobutyl ketone | 3.58% |
| Red iron oxide | 1.27% |
| #19 Brown pigment (iron, aluminum and titanium oxide from Shepherd Chemical Co.) | 3.91% |
| Carbon black | .42% |
| Calcined alumina | 9.19% |
| Portion 1 | 4.52% |
| "Triton X-100" (octyl phenol polyether alcohol surfactant from Rohm & Haas Co.) | .52% |
| "Cymel 301" (melamine-formaldehyde resin from American Cyanamid) | 7.00% |
| Citric acid | 3.00% |

Portion 1 was prepared in an oven where the temperature is monitored using a thermocouple placed halfway down in the layer of powder. When the temperature reached 260° C. it was maintained for 15 minues.

Portion 2 was prepared by milling all the ingredients, except for the "Cymel 301" resin and citric acid, in a pebble mill for 20 hours. At the conclusion of this time, the "Cymel 301" resin and citric acid were added and milling continued for an additional 30 minues. The resulting dispersion was sprayed onto polyester, polysulfone and polycarbonate substrates and baked 20 minutes in a 107° C. oven. The resulting finishes were tough, scratch resistant and abrasion resistant, and exhibited moderate release properties.

EXAMPLE 2

| | |
|---|---|
| "Epon 1007" epoxy resin | 14.84% |
| Butyl acetate | 33.79% |
| Cellosolve acetate | 12.68% |
| n-Butyl alcohol | 5.28% |
| Methyl isobutyl ketone | 3.58% |
| Red iron oxide | 1.27% |
| #19 Brown pigment | 3.91% |
| Carbon black | .42% |
| Calcined alumina | 9.19% |
| Portion 1 of Example 1 | 4.52% |
| Triton X-100 | .52% |
| "Beetle-65" (Melamine-formaldehyde resin from American Cyanamid Co.) | 7.00% |
| Citric acid | 3.00% |

The ingredients, except for the "Beetle-65" resin and citric acid, were placed in a pebble mill and milled for 20 hours. At the conclusion of this time, the "Beetle-65" resin and citric acid were added to the mill and milling was continued for an additional 30 minutes. The dispersion was sprayed onto a polysulfone substrate and baked for 10 minutes in a 107° C. oven. The resulting films were tough, scratch resistant and exhibited moderate relates properties.

EXAMPLE 3

A coating composition was prepared as follows:

| | |
|---|---|
| "Epon 1007" epoxy resin | 16.06% |
| Butyl acetate | 33.77% |
| Cellosolve acetate | 12.47% |
| n-Butyl alcohol | 5.26% |
| Methyl isobutyl ketone | 3.56% |
| Red iron oxide | 1.25% |
| #19 Brown pigment | 3.92% |
| Carbon black | .44% |
| Calcined alumina | 5.37% |
| Portion 1 of Example 1 | 9.00% |
| "Cymel 301" resin | 6.93% |
| Citric acid | .97% |
| Dow Corning 510 silicone fluid | 1.00% |

The ingredients except for the "Cymel 301" resin, citric acid and the Dow Corning fluid, were placed in a pebble mill and milled for 20 hours. At the conclusion of this time, the "Cymel 301" resin, citric acid and Dow Corning fluid, were added and milling continued for another 30 minutes. The dispersion was then sprayed onto a polysulfone substrate and baked 10 minutes in a 107° C. oven. The resulting films were tough, scratch resistant and exhibited moderate release properties.

EXAMPLE 4

A coating composition is prepared as follows:

| | |
|---|---|
| "Epon 1007" epoxy resin | 15.21% |
| Butyl acetate | 33.57% |
| Cellosolve acetate | 12.60% |
| n-Butyl acetate | 5.31% |
| Methyl isobutyl ketone | 3.60% |
| Red iron oxide | 1.26% |
| #19 Brown pigment | 3.96% |
| Carbon black | .45% |
| Calcined alumina | 4.41% |
| Portion 1 of Example 1 | 9.09% |
| Triton X-100 | .54% |
| "Cymel 301" resin | 7.00% |
| Citric acid | 3.00% |

The ingredients, except for the "Cymel 301" resin and citric acid, were placed in a pebble mill and milled for 20 hours. At the conclusion of this time, the "Cymel 301" resin and citric acid were added to the mill and milling continued for an additional 30 minutes. The dispersion was then sprayed on polyester, polysulfone and polycarbonate substrates and baked for 10 minutes in a 107° C. oven. The resulting films were tough, scratch resistant and exhibited moderate release properties.

I claim:

1. A coating composition consisting essentially, in percent by weight of (A), (B), (C), (D) plus (E), of a dispersion in a liquid organic media of about:
   (A) 10-50% of an epoxy resin containing, on the average, two terminal 1,2-epoxy groups per molecule and having an epoxy equivalent weight of 750-5000;
   (B) 1-20% of a melamine formaldehyde resin;
   (C) 1-10% particulate polymer polymerized or copolymerized from monomers selected from one or more monoethylenically unsaturated hydrocarbon monomers and hydrocarbon ether monomers, said monomers being completely substituted with fluorine atoms;

(D) 0.2–5% citric acid; and
(E) the balance being said liquid organic media.

2. The coating composition of claim 1 wherein
(A) is present in the range of 5–25%,
(B) is present in the range of 5–10%,
(C) is present in the range of 3–8%, and
(D) is present in the range of 1–4%.

3. The coating composition of claim 2 wherein
(A) is present at about 18%,
(B) is present at about 7%,
(C) is present at about 5.5% and,
(D) is present at about 3.0%.

4. The coating composition of claim 1 wherein (C) is a homopolymer of tetrafluoroethylene.

5. The coating composition of claim 1 wherein (C) is a tetrafluoroethylene polymer selected from (1) homopolymers of tetrafluoroethylene and (2) copolymers of tetrafluoroethylene and an ethylenically unsaturated comonomer wherein the comonomer constitutes up to 10% by weight of the copolymer, said polymer having been irradiated with $\gamma$-rays until it has received a dose of at least 2 M Rads and being further characterized in, having a number average particle size of less than 5 $\mu$m as measured optically.

6. The process of coating a substrate of polysulfone, polyester or polycarbonate resin with a coating composition of claim 1 and then curing the coating on the substrate at a temperature no higher than about 120° C.

* * * * *